April 22, 1952
W. H. GUY
2,593,555
APPARATUS FOR THE TREATMENT OF FILAMENTARY
MATERIALS, PARTICULARLY WITH LIQUIDS
Filed Jan. 23, 1948
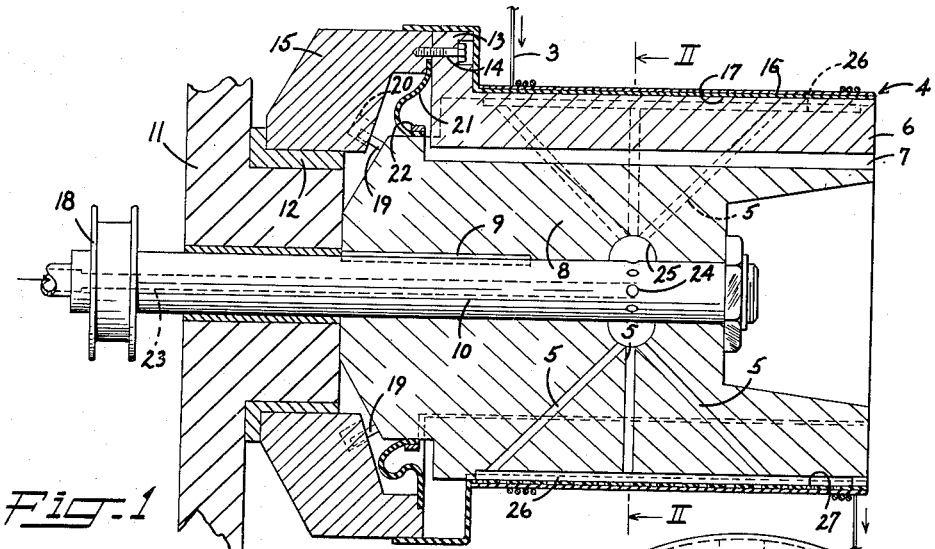
Fig. 1
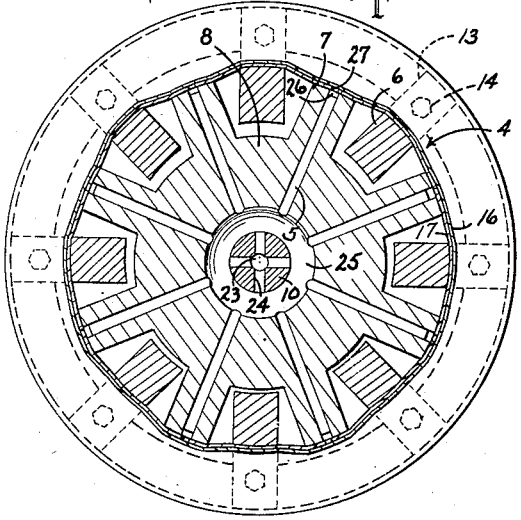
Fig. 3
Fig. 2
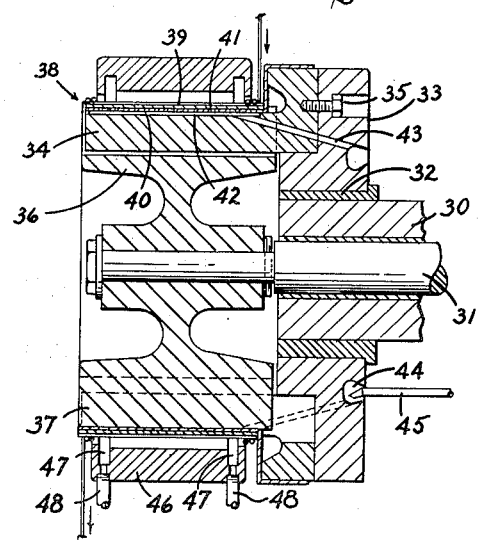
Fig. 4
INVENTOR.
WARREN H. GUY
BY
Thomas R O'Malley Patented Apr. 22, 1952

2,593,555

UNITED STATES PATENT OFFICE 2,593,555

APPARATUS FOR THE TREATMENT OF FILAMENTARY MATERIALS, PARTICULARLY WITH LIQUIDS

Warren H. Guy, Folsom, Pa., assignor to American Viscose Corporation, Wilmington, Del., a corporation of Delaware Application January 23, 1948, Serial No. 3,994

5 Claims. (Cl. 68—205)

This invention relates to apparatus for the handling of filamentary material of indefinite length such as yarns, threads, tows, and other multi-filament strands, whether of natural or artificially produced fibers or continuous filaments.

It is a general object of the present invention to provide an improved system for the handling and treatment of filamentary strands having indefinite length, particularly with liquids, and it involves the carrying of the material through a plurality of laterally displaced convolutions, such as through a generally helical path, pressing a saturated liquid-permeable member moving with the material against the inside of the convolutions of the material. During the travel of the filamentary material through the path, the member is alternately pressed against and withdrawn from contact with the turns of the strand and liquid is continuously supplied to the permeable member so as to transfer the liquid in a thoroughly uniform fashion to the turns of the strand in the path. In general, the liquid flows through the permeable member from which it oozes out into contact with the strand under the influence of the pressure against the strand, centrifugal force, or the pressure of the liquid within the member, or by virtue of any combination of these three forces.

A further object of the invention is to provide a form of apparatus adapted to efficiently perform the method. In general, the apparatus comprises a device (either in the form of a reel or two or more canted rollers or drums) for advancing the strand of material through a path comprising a plurality of laterally displaced convolutions about one or more cylindrical members, at least one thereof having a liquid-permeable outer surface or covering upon which the convolutions are carried and through which the liquid may be supplied to the convolutions in any suitable fashion, such as, in the preferred system, by means of conduits disposed within the cylindrical member.

These and other objects as well as the advantages of the improved method and apparatus will be pointed out hereinafter in connection with the description of the drawings, in which—

Figure 1 is a transverse cross-section of a preferred form of device constituting a part of the invention and adapted to carry out the method of the invention, Figure 2 is a section on line II—II of Figure 1, Figure 3 is a perspective of the upper part of the section shown in Figure 2 with parts broken away, and Figure 4 is a transverse section of a modification.

Referring to Figures 1 to 3, the method comprises passing a strand of the filamentary material indicated at 3 in a generally helical path about a thread-advancing device comprising a generally cylindrical member provided with a liquid-permeable cover 4. A liquid is supplied within the cylindrical member such as by conduits 5 so that it passes through the liquid-permeable member 4 and oozes out into contact with the turns of the strand carried thereabout. By such procedure, the liquid is well distributed to the filamentary material in the helix without substantially displacing the turns of the helix from their relative dispositions therein. In addition, the liquid is supplied to all parts of each turn and especially to the under surface of the turn in direct contact with the permeable cover.

As shown in Figures 1 to 3, the thread-advancing device may comprise any form of thread-advancing, thread-storage device in which successive convolutions of the strand are displaced axially along the periphery of the thread carrying system, if such device is provided with a liquid-permeable cover forming the periphery thereof and adapted to receive liquid from suitable conduit means 5. As specifically shown in Figures 1 to 3, the liquid-permeable member 4 is provided about the periphery of a generally cylindrical thread-advancing reel comprising two sets of interdigitating bars 6 and 7. The set of bars 7 may be formed in a generally cylindrical element 8 by grooving its periphery in a direction parallel to the axis. The member 8 is secured by key 9 to a shaft 10 rotatably mounted within a bearing 11 of a suitable supporting structure or frame (not shown). An outer bushing 12 is provided on the bearing 11 and has a bearing surface the axis of which is inclined to the axis of shaft 10; preferably, though not necessarily, the bearing surface of bushing 12 is also offset from the axis of shaft 10 so that the axes do not intersect. The bars 6 have upwardly projecting portions at 13 which receive screws 14 by which the bars are secured to a common annular member 15 mounted to rotate upon the inclined bearing surface of bushing 12. The outer surfaces of bars 7 are concentric with respect to the axis of shaft 10, whereas the outer surfaces of bars 6 are concentric with respect to the axis of the bearing provided by bushing 12. While the reel is shown mounted for rotation upon a horizontal axis, it may be inclined at any angle to the horizontal, if desired.

The permeable member 4 is secured at its inner surface to each of the bars 6 and 7. As shown (see particularly Fig. 3), the member 4 may be of composite or laminar structure and comprise an outer layer 16 of liquid-permeable character joined to an inner layer of impermeable character, though the impermeable layer may be omitted if desired. The material of which the permeable member is made may be selected from among a great variety, such as sponge rubber or any spongiform synthetic rubber or substitute for rubber, preferably having extremely minute intercommunicating pores. For handling certain liquids, a hardened microporous gelatine layer may be used. Also, a rather dense but still liquid-permeable belt, or even a woven or knitted fabric having a tight stitch and preferably well-napped may be used. The fibers of such a fabric should be coarser than those of the yarn to be treated or, after napping, the fabric may be resin-impregnated to reduce the fuzziness and liability of the fabric fibers to become entangled with the fibers of the strand being treated. The member 4 should have as small a total thickness as is consistent with good distribution and transmission of liquid from the inside to the turns of thread on the outside. Thicknesses ranging from the order of $\frac{1}{32}$ to $\frac{1}{8}$ inch, more or less, are suitable when operating with reels having 5 to 8 inch diameters. With larger diameters, thicker members are permissible, while with smaller diameter reels, thinner cover members are required. When a composite or laminar permeable member is employed, the impermeable member may be of a material having the same or different chemical constitution as that of the liquid-permeable layer.

A pulley 18 secured to shaft 10 may serve to drive the reel and the motion of the member 8 may be transmitted to the set of bars 6 by means of pins 19 projecting from the member 8 into recesses 20 in the annular member 15. If desired, a flexible sealing membrane 21 may extend from one end of the cylindrical member 8 where it is secured by a ring 22 to the juncture between the projections 13 and the annulus 15.

Liquid may be supplied through a bore 23 in the shaft 10 and through the radial passages 24 to an annular chamber 25 within the member 8 from which the several conduits 5 branch out. As shown more particularly in Figures 2 and 3, the conduits 5 extend outwardly in radial planes through bars 7 to channels 26 extending generally longitudinally of the bars and over which the permeable member 4 is secured. When the member 4 comprises an inner impermeable layer 17, this layer is provided with one or more openings 27 in registry with the channel 26 to distribute the liquid into the permeable layer 16.

Because of the disposition of the two sets of bars 6 and 7 on inclined axes as described, they move relative to one another so as to transfer the thread from one set to the other set along one side of the reel and vice versa along another side of the reel during the rotation and in addition such transfer effects an advance of each turn toward the unsupported end of the reel shown. The permeable member 4 is secured to the outer surfaces of the bars of both sets along their entire length and thereby follows their motions and carries the thread convolutions through the helix. In this embodiment where the bars of one set are constantly moving in and out relative to those of the other set, it is necessary that the permeable member be sufficiently flexible to allow of such relative movement. It can be, but need not be, not only flexible but also elastic, as in the case of a microporous or synthetic rubber member.

During rotation of the reel, the liquid is supplied to the permeable member and is caused to ooze into contact with the thread carried thereover. Actually, the liquid oozed out may form a substantially continuous film enveloping the helix and this film may or may not be broken away from the semi-permeable member at those points adjacent receding bars, i. e., where the bars are retracted so that the semi-permeable member no longer makes contact with the turns of thread in the helix. By inclining the axis of the reel one way or the other to the horizontal, the liquid can be given a flow toward one or the other end of the helix, to effect countercurrent or concurrent action of the liquid thereupon. Each bar is alternatively pressed into contact with the threads and withdrawn out of contact therewith, and between each contact, the turns of thread are advanced to a new position axially displaced toward one end of the reel, such as the unsupported end in Figures 1 to 3. This repeated pressing and relief from pressure constitutes a gentle working of the threads which facilitates the liquid treatment thereof, but since the liquid when first applied to the turns of filamentary material oozes from the permeable surface thereunder in areas adjacent to each side of, as well as beneath each convolution, there is substantially no opportunity or occasion for displacement of the turns or of individual fibers in the turns, relative to their proper position in the helix. Hence, the present method assures that a thorough and efficient liquid treatment can be effected without any danger of intercrossing of fibers of filaments from adjacent turns which would give rise to possible breakage and non-uniform processing.

Although the reel shown in Figures 1 to 3 is of cylindrical construction and the liquid is supplied through the shaft used for driving the reel, other constructions can be employed including a conical or frusto-conical reel in which the turns of the helix proceed about a progressively larger diameter periphery when increased tension or stretching is desired, or about a progressively smaller diameter periphery in certain cases when shrinkage is desired. Figure 4 shows a modification of the liquid supply conduit system. In general, this reel comprises a frame member 30 within which the driving shaft 31 is mounted for rotation and about which a bushing 32 provides a bearing surface for an annular flange or disc 33. The axis of bearing surface 32 is inclined, or offset and inclined, relative to the axis of shaft 31 as in the embodiment of Figures 1 to 3. A set of bars 34 are secured to the disc 33 by means of screws 35 and a cylindrical member 36 is peripherally grooved to provide bars 37 having peripheral surfaces concentric relative to the axis of shaft 31. The bars 34 are provided with peripheral surfaces concentric with the axis of the bearing bushing 32 and, as in the first embodiment, a permeable member 38 is secured to both sets of bars. The permeable member may, as in Figures 1 to 3, comprise an outer microporous layer 39 and an inner impermeable layer 40 provided with openings 41 disposed along a channel 42 in the outer surface of bars 34. Passages 43 connect the channels 42 with an annular recess or groove 44 into which a liquid is supplied at the lower part of the reel by means of a stationary nozzle 45. In this embodiment, it is desirable to rotate the reel at sufficient speed to move the liquid out to the permeable member by virtue of centrifugal force.

It is to be understood that in both embodiments, the rate of rotation of the thread-advancing device may be sufficient to move the liquid by centrifugal force out to the permeable member in all parts of the periphery regardless of whether such force has to overcome gravity or is favored by gravity. When operating at high speeds, it may be desirable to surround the periphery of the thread-advancing device with a deflector for returning the liquid to the system of windings on the reel, as shown at 46, and this deflector may be provided with liquid-discharge grooves 47 connected with conduits 48 adjacent to the ends of the thread-advancing device. If desired, however, the apparatus may be employed at relatively low speeds of rotation and reliance upon the pressure of the liquid or upon the pressure of contact of the permeable member against the windings of the strands may be had to obtain the oozing action into contact with the threads. Regardless of whether the oozing is dependent largely upon a particular one of the three factors (pressure contact of the permeable member with the windings, liquid pressure within the permeable member, or centrifugal force) or whether two or more of such factors are relied upon, the application of the liquid to the turns of the strand is under control, though the rate of flow of liquid thereto may vary widely. As stated hereinabove, the oozing action assures efficient application and thorough distribution of the liquid upon the windings and especially upon those portions of the windings which make contact with the permeable member and at the same time the application of the liquid to the turns is controlled so as to prevent any substantial displacement of the turns or fibers in the turns from their positions relative to the helix.

It is to be understood that changes and variations may be made without departing from the spirit and scope of the invention as defined in the appended claims.

I claim:

1. Apparatus for treating filamentary material with liquid comprising a thread-advancing reel having two sets of interdigitating bars, means for imparting relative motion to the bars for advancing the filamentary material in a helical path thereabout, a flexible liquid-permeable cover secured to the bars for receiving and carrying the material thereon, and conduit means inside the cover for conducting a liquid thereto, said conduit means comprising channels through at least some of the bars communicating with the cover at the juncture of the bars with the cover.

2. Apparatus in accordance with claim 1 in which the cover comprises an inner impermeable layer and an outer permeable layer and the inner layer has passages therethrough connecting the conduit means with predetermined areas of the permeable layer.

3. Apparatus in accordance with claim 1 in which the reel comprises a hollow shaft provided with openings constituting the entrance for the conduit means and the bars are mounted for rotation by and with the shaft.

4. Apparatus for treating filamentary material with liquid comprising a thread-advancing reel having two sets of interdigitating bars, means for imparting relative motion to the bars for advancing the filamentary material in a helical path thereabout, a flexible liquid-permeable cover secured to the bars for receiving and carrying the material thereon, and conduit means inside the cover for conducting a liquid thereto, said conduit means comprising channels through one set of the bars communicating with the cover at the juncture of the bars with the cover.

5. Apparatus for handling strands of filamentary material comprising two sets of interdigitating bars, means for imparting relative motion to the bars for advancing a strand of the filamentary material in a generally helical path thereabout, a flexible, liquid-permeable cover, said cover being secured to the bars of each set and extending around the reel to constitute the strand-carrying periphery thereof, and conduit means within the reel communicating with the inside wall of the permeable cover for feeding a liquid thereto, said cover comprising an inner impermeable layer and an outer permeable layer and the inner layer has passages therethrough connecting the conduit means with predetermined areas of the permeable layer, and said conduit means comprising channels through at least some of the bars communicating with the cover at the juncture of the bars with the cover.

WARREN H. GUY.

REFERENCES CITED

The following references are of record in the file of this patent:

UNITED STATES PATENTS

| Number | Name | Date |
|--------|------|------|
| 350,786 | Walters | Oct. 12, 1886 |
| 575,836 | Henrici | Jan. 26, 1897 |
| 1,902,429 | Wenzel | Mar. 21, 1933 |
| 2,020,057 | Hartmann | Nov. 5, 1935 |
| 2,145,281 | Walters | Jan. 31, 1939 |
| 2,368,386 | Tarbox | Jan. 30, 1945 |
| 2,513,381 | Truitt | July 4, 1950 |